Figure 1:
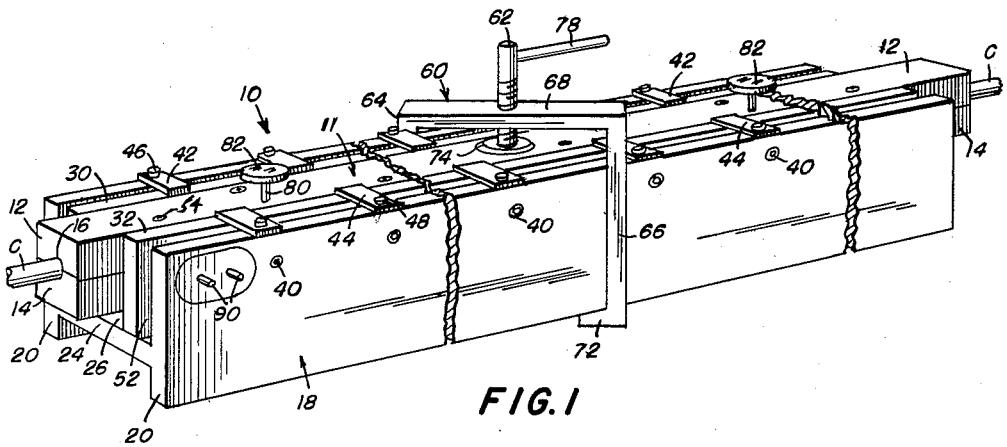

Sept. 17, 1963

J. E. STEIN ETAL 3,103,704

APPARATUS FOR COATING A SPLICE

Filed Dec. 29, 1960

2 Sheets-Sheet 1

INVENTORS
JOHN STEIN
RICHARD INGRAM

BY *Fisher, Christer & Goodson*

ATTORNEYS

Sept. 17, 1963    J. E. STEIN ETAL    3,103,704
APPARATUS FOR COATING A SPLICE
Filed Dec. 29, 1960    2 Sheets-Sheet 2

INVENTORS
JOHN STEIN
RICHARD INGRAM
BY Fisher, Christen & Goodson
ATTORNEYS 3,103,704
APPARATUS FOR COATING A SPLICE
John E. Stein, Culpeper, and Richard T. Ingram, Rixeyville, Va., assignors to Rochester Ropes, Inc., Culpeper, Va., a corporation of New York
Filed Dec. 29, 1960, Ser. No. 79,309
1 Claim. (Cl. 18—36)

This invention relates to an apparatus for reapplying a plastic coating to that area of a plastic coated cable from which a portion of its coating is stripped for purposes of making a splice.

In many environments of use for wire cable it has been found very desirable to have the cable coated with plastic for purposes of appearance, preservation and to eliminate noise where the cable comes in contact with pulleys and other pieces of associated equipment. In many adaptations of such use, the cable is of a continuous loop type requiring a splice. In splicing the ends of a cable together to form a continuous loop, it is well known in the art to cut the individual strands at different lengths and space the connections between the individual strands at points along the cable in order that there will not be a large protrusion at any one spot. The individual strand splices are normally spaced at a certain distance from each other depending on the size and cable construction so that the entire spliced section may cover a length of cable anywhere from 5 to 20 ft.

In the field of plastic coated cables, there has been much difficulty in reapplying a satisfactory coating to the length of cable which necessarily has to be stripped in order to perform the splicing operation. Methods, such as wrapping the spliced area with a plastic ribbon, painting the spliced area with many layers of quick-drying plastic and other methods have not proven satisfactory. It is therefore a primary objective of this invention to provide an apparatus for accomplishing this recoating operation.

Another objective of this invention is to provide a mold which has electric strip heaters adjacent the sides of a split mold, such that heat and pressure are simultaneously applied to the split tube when it is placed in the mold.

Another objective of the invention is to provide a mold which is equipped with means to detect the interior temperature of the mold so that pressure may be applied at a rate coordinated with desired temperatures.

A further objective of this invention is the provision of apparatus which will readily handle substantial lengths of cable with a minimum of complications.

Another objective of the invention is the provision of a support for the mold and heating elements which will be substantially insulated from the framing members.

These and other objectives of the invention will become more readily apparent upon a reading of the following specification and claim taken in conjunction with the attached drawings.

Figure 2:
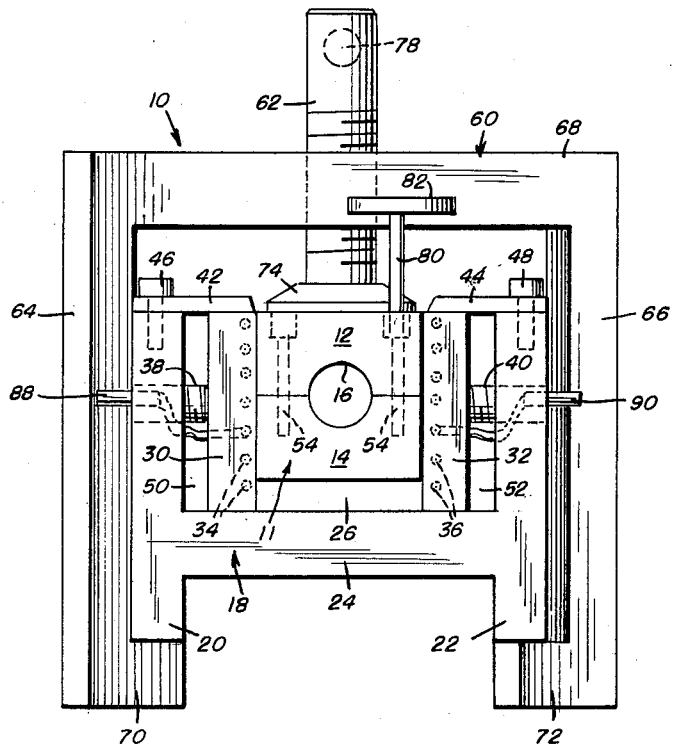
Figure 3:
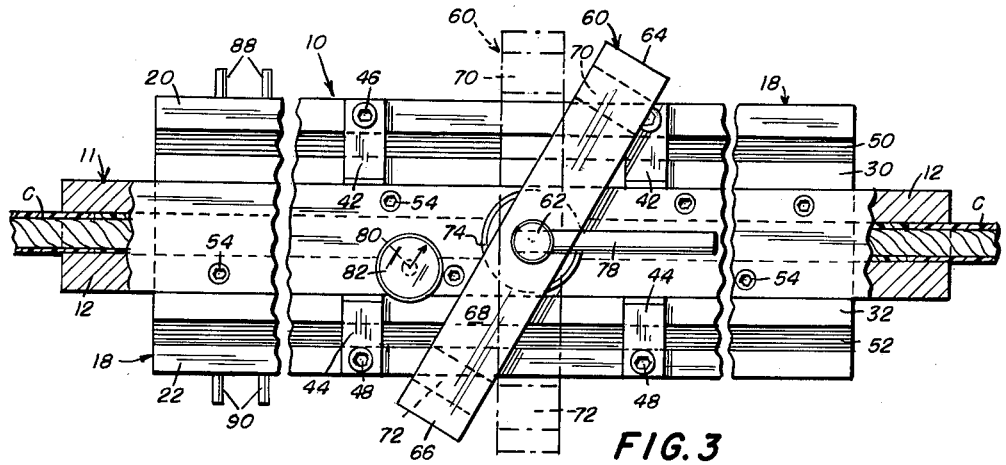
Figure 4:
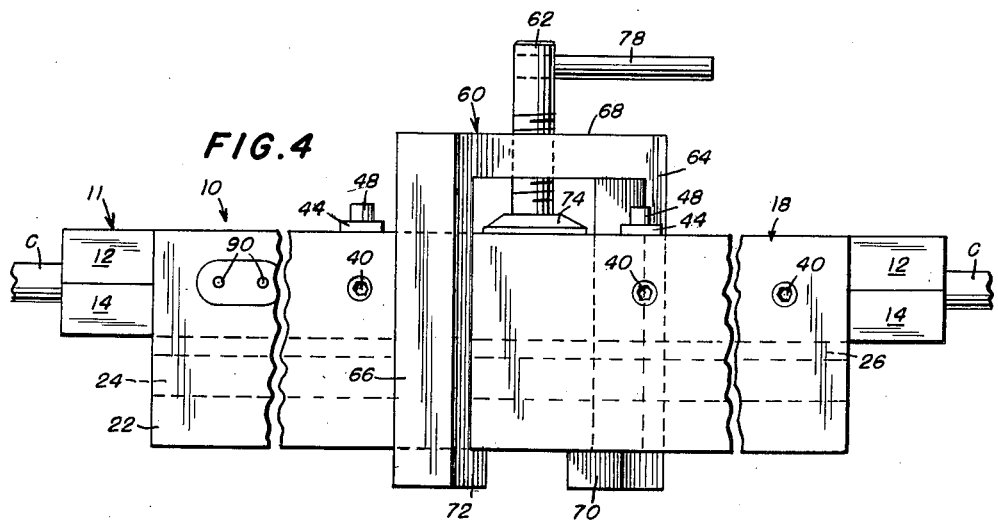
Figure 5:
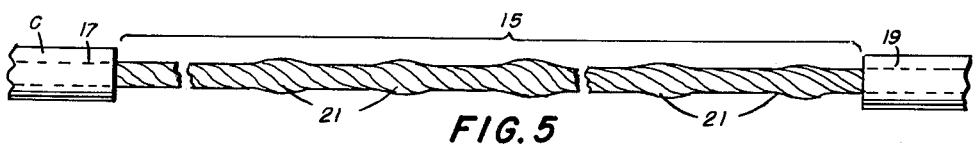
Figure 6:
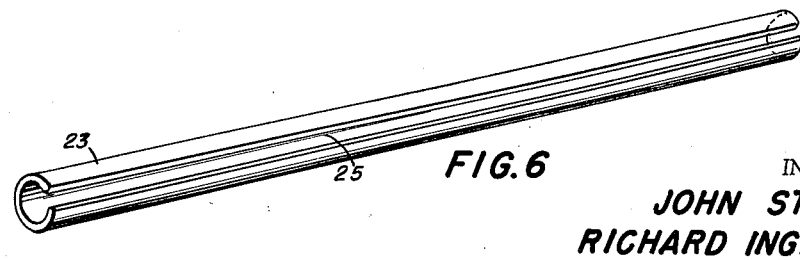

In the drawings:
FIG. 1 is a perspective view of the structure of this invention;
FIG. 2 is an end elevation view;
FIG. 3 is a plan view;
FIG. 4 is a side elevation view;
FIG. 5 is a partial diagrammatic view of the cable after splicing and before re-coating with points of splice greatly enlarged; and
FIG. 6 is a perspective view of the split tubing.

Referring now to the drawings where like numerals indicate like parts, the numeral 10 indicates the apparatus utilized in this invention. The principal operating member of the apparatus is a die comprised of an elongated split chuck 11 having an upper jaw 12 and lower jaw 14. Along opposing surfaces of the jaws a cylindrical mold 16 is formed having a diameter identical to the diameter of the plastic coated cable when the jaws are in engagement with each other.

In FIG. 5, there is shown a section of an endless loop cable C which has been stripped and spliced together. The splice area 15 is that area between the two coated sections 17 and 19. Note the very slight irregularities 21 (greatly enlarged in the drawing) at intervals along the splice length. These irregularities diagrammatically depict the points where the individual strands are joined to the main cable. As stated heretofore these points are spaced a substantial distance (normally over one foot) from each other, causing a splice area many feet in length.

A piece of plastic tubing 23 having a length the same as the splice length 15 is longitudinally slit at 25. The tubing is adapted to be placed over length 15 by inserting the stripped cable through slot 25. The ends of the tube, therefore, will abut the plastic coated sections 17 and 19.

The chuck 11, which receives splice and tube, is supported in an elongated H-shaped frame 18 having vertical side members 20 and 22 joined by a cross member 24. The bottom jaw 14 is supported on the cross member and is spaced therefrom by an insulation strip 26.

A pair of vertically disposed strip heaters 30 and 32 run the longitudinal length of the chuck and have heating wires 34 and 36 embedded therein. A series of threaded set screws 38 and 40 along the length of vertical members 20 and 22 respectively, snugly position the strip heaters adjacent the chuck. For further securing the strip heaters several pairs of positioning tongues 42 and 44 are affixed to the upper surface of side members 20 and 22 so as to overlap the upper surface of the strip heaters. The tongues are secured in position by a series of screws 46 and 48. Air spaces 50 and 52, between the side members 20 and 22 and the strip heaters aid in the insulation thereof.

Further set screws 54 are provided to initially position the split mold with respect to each other. The final pressure is transmitted to the chuck via a U-shaped clamp 60.

The clamp 60 is comprised of two uprights 64 and 66 joined at their upper ends by cross member 68. The lower ends of uprights 64 and 66 are terminated by short inwardly directed lugs 70 and 72 which engage the bottom surface of legs 20 and 22. Referring to FIG. 3, it can be seen that clamp 60 has two positions. The position shown by dotted lines is the quick release position and the position in full lines indicates the clamping position. When the clamp is 90° to the frame 18, in its quick release position, it is easily removed because the space between the lugs is greater than the width of the frame.

A screw 62 is thready received in cross member 68 and terminates in a bearing member 74 which engages the upper surface of jaw 12. The upper end of screw 62 is provided with a turning lever 78. It can be seen that a turning of screw 62 will tighten the upper and lower dies with respect to each other and progressively apply pressure to a splice residing in the mold 16. A series of thermometers 80 extending through the jaws to the vicinity of the cable have indicating dials 82 readily observable by an operator.

In operation the splice length 15 is inserted within the plastic tube 23 via the longitudinal slit 25. The tube is made of a thermoplastic material suitable for cable coating and in most instances is identical to the plastic material which was stripped for purposes of the splice. The tube 23 is usually over 4 feet in length and has an outside diameter only slightly greater than the outside circumference of the original coated cable. The tubing has a thickness sufficient to permit plastic to enter the interstices of the cable as pressure is applied through chuck 12.

The spliced area and the tube are placed within the chuck so that several inches of the die will overlap the unstripped portions of the cable. Electricity is applied through the inlets 88 and 90, causing strip heaters 30 and 32 to increase in temperature.

As the temperature increases, the plastic will become softer depending on the particular plastic's characteristics. As the plastic gradually becomes fluid, additional pressure is applied to the molds by rotating screw 62. Therefore heat and pressure are simultaneously applied to the splice area. An operator of the machine will rapidly learn the most efficient temperatures at which the jaws 12 and 14 should be brought together for various size cables and types of plastic. For purposes of illustration, it has been found that a ⅜" wire cable coated with a particular nylon is best recoated when a final pressure (jaws 12 and 14 together) is reached at a temperature of approximately 250° F.

In those instances where the splice length is greater than the length of the chuck, the chuck is placed over one end of either sections 17 and 19 and a first piece of tubing is applied. These pieces of tubing are then applied one at a time until the entire splice is coated.

In a general manner, while we have, in the above description, disclosed what we deem to be practical and efficient embodiments of our invention, it should be well understood that we do not wish to be limited thereto, as there might be changes made in the arrangement, disposition and form of the parts without departing from the principle of the present invention as comprehended within the scope of the accompanying claim.

We claim:

In apparatus for re-coating that portion of a plastic-coated wire cable from which the plastic coating has been removed to make a splice, the combination including, an elongated flat-bottomed mold-supporting frame provided with a pair of oppositely disposed spaced upright side members, an elongated two-piece mold positioned in said frame between said side members having a uniform circular cross-sectional internal configuration along its length similar to the exterior configuration of the plastic coating over the remainder of the cable and having a uniform rectangular exterior cross-sectional configuration along its length, a pair of elongated heating elements each positioned in said frame between said mold and a respective one of said side members, said side members having inwardly directed positioning tongues engaging with the tops of the respective heating elements, said elements having at least one flat side to abut against an exterior surface of said mold, said side members being provided with adjusting means for urging said heating elements towards each other against opposite sides of the mold, and a quick-detachable inverted U-shaped clamping member having inwardly directed portions at the extremities of the U-shaped arms for engagement with the under side of the supporting frame and also having adjustable means for engagement with the top of said mold to exert downward force thereon.

References Cited in the file of this patent

UNITED STATES PATENTS

| | | |
|---|---|---|
| 1,795,680 | Reid | Mar. 10, 1931 |
| 1,925,993 | Cassley et al. | Sept. 5, 1933 |
| 2,004,589 | Smedley | June 11, 1935 |
| 2,115,143 | Harrison | Apr. 26, 1938 |
| 2,454,193 | Martin | Nov. 16, 1948 |
| 2,464,232 | Hudson | Mar. 15, 1949 |
| 2,566,797 | Heinz | Sept. 4, 1951 |
| 2,695,853 | Foreit | Nov. 30, 1954 |
| 2,768,105 | Dittmore et al. | Oct. 23, 1956 |
| 2,885,735 | Dittmore et al. | May 12, 1959 |